United States Patent [19]

Wright

[11] Patent Number: 4,722,875

[45] Date of Patent: Feb. 2, 1988

[54] ELECTROCHEMICAL CELL

[75] Inventor: Michael L. Wright, Allestree, England

[73] Assignee: 501 Lilliwyte Societe Anonyme, Luxembourg

[21] Appl. No.: 908,571

[22] Filed: Sep. 18, 1986

[30] Foreign Application Priority Data

Sep. 23, 1985 [GB] United Kingdom ................. 8523444

[51] Int. Cl.[4] ..................... H01M 10/36; H01M 10/39
[52] U.S. Cl. ..................................... 429/103; 204/2.1; 29/623.1
[58] Field of Search ....................... 429/103; 29/623.1; 204/2.1

Primary Examiner—Donald L. Walton
Attorney, Agent, or Firm—Arnold, White & Durkee

[57] ABSTRACT

This invention provides a method of making a cathode for a high temperature rechargeable electrochemical cell. A mixture is formed in particulate form of an alkali metal chloride such as sodium chloride and a substance comprising a transition metal such as iron, and the mixture is impregnated with a chloride ion-containing alkali metal aluminium halide molten salt liquid electrolyte such as molten sodium aluminium chloride. The impregnated mixture is then subjected to at least one charge cycle in a high temperature cell in which it forms the cathode and is separated from an alkali metal anode by a solid electrolyte separator.

19 Claims, 2 Drawing Figures

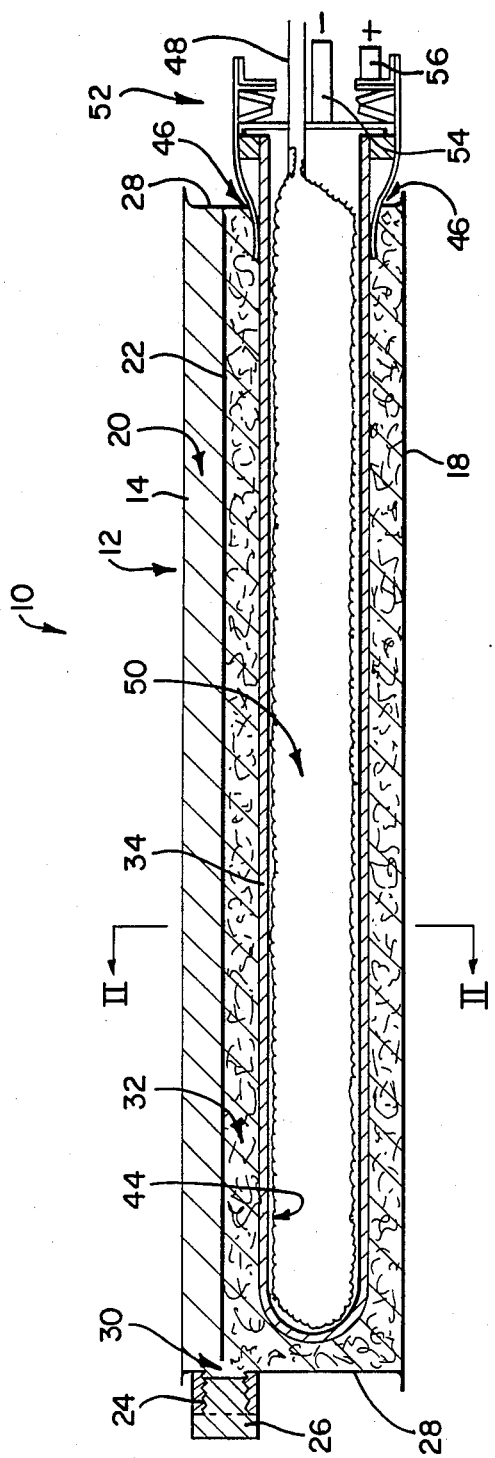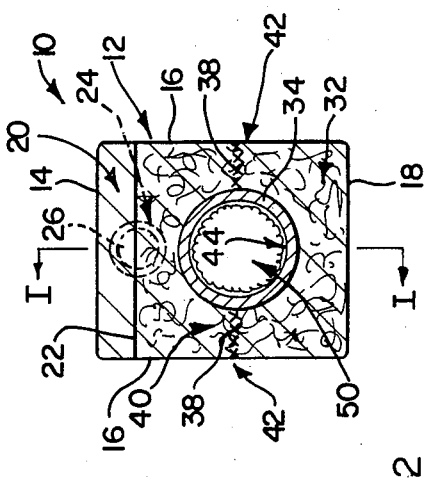

ELECTROCHEMICAL CELL

This invention relates to a method of making a cathode for a high temperature rechargeable electrochemical cell. The invention also relates to a cathode precursor for a high temperature rechargeable electrochemical cell, to a method of making such cathode precursor, and to a method of making a high temperature rechargeable electrochemical cell precursor.

According to the invention there is provided a method of making a cathode for a high temperature rechargeable electrochemical cell, which method comprises forming a mixture in particulate form of an alkali metal chloride and a substance comprising a transition metal selected from the group consisting of iron, nickel, cobalt, chromium, manganese and mixtures of at least two thereof, impregnating the mixture with a chloride ion-containing alkali metal aluminium halide molten salt liquid electrolyte, and subjecting the impregnated mixture to at least one charge cycle in a high temperature electrochemical cell in which the impregnated mixture forms the cathode, said impregnated mixture being located in a cathode compartment in the cell and separated from an anode compartment in the cell by a solid electrolyte separator, and alkali metal being formed in the anode compartment during said charge cycle.

The alkali metal of the alkali metal chloride, and of the molten salt electrolyte are typically the same, and may be a mixture of alkali metals or preferably a single alkali metal, eg lithium or preferably sodium. Thus, the alkali metal chloride may be sodium, the alkali metal of the alkali metal aluminium halide also being sodium and the separator being a solid conductor of sodium ions.

The mixture may be formed by mixing together the alkali metal chloride in powder form with a powder comprising at least one member of the group consisting of said transition metals in metallic form and the intermediate refractory hard metal compounds of said transition metals, said intermediate refractory hard metal compounds comprising at least one non-metal selected from the group consisting in carbon, boron, nitrogen, silicon and phosphorous.

In a particular embodiment, sodium chloride in powder form may be mixed with a metallic powder selected from the group consisting of iron, nickel, and mixtures thereof. Suitable iron and nickel powders are available from William Rowland Limited, Sheffield, England, respectively as 'TYPE C CARBONYL' and 'TYPE 255 CARBONYL'.

Cathodes made in accordance with the above-described method will typically be used in electrochemical cells in which the anode substance comprises sodium, the charged anode being eg molten sodium, the molten salt electrolyte being liquid at the operating temperature of the cell and the active anode material being separated from the cathode and molten salt electrolyte by a separator comprising a solid conductor of sodium ions such as beta-alumina or nasicon. It follows that the cathode may be made in the cell in which it is eventually intended to be used, or, instead, it may be made in a separate cell, from which it may be removed after formation, and loaded, either in its charged or uncharged state, or in a partially charged state, into the cell in which it is eventually to be used. When the cathode is to be removed after formation, it may be put through several charge/discharge cycles in the cell in which it is formed, before removal.

Impregnation of the powder with the molten salt electrolyte may simply be by wetting the mixture with the electrolyte in molten liquid form. However, impregnating the mixture containing the alkali metal halide and transition metal halide is preferably by saturating the mixture with the molten salt electrolyte in liquid form.

Prior to the saturation, the mixture may be loaded into the cathode compartment of the cell in which the charge cycle takes place, being consolidated, eg by tamping, in said cathode compartment, the mixture being heated to a temperature at which the molten electrolyte is molten before the molten electrolyte is impregnated into the mixture. As described in more detail hereunder, this will in effect provide a cathode precursor in accordance with the present invention, and indeed a cell precursor in accordance with the invention as described hereunder, the finished cathode or cell, as the case may be, being obtained from its precursor by taking it through at least one charge cycle.

During the initial charge cycle of the method, the substance comprising the transition metal is chlorinated, alkali metal being produced in ionic form during said chlorination, which alkali metal moves through the liquid electrolyte and separator in ionic form, into the anode compartment where it emerges and exists in the charged or partially charged cell as molten metal, electrons passing during the charging along the external circuit employed for the charging, from the cathode compartment to the anode compartment. In accordance with the method of the present invention, and when making a cathode precursor and/or cell precursor in accordance with the present invention, it is accordingly in principle unnecessary to provide any starting alkali metal in the anode compartment, the alkali metal being produced during the first charge cycle as required for use in the method and or for use as anode material in the eventual cell.

At the start of the first charge cycle to which the impregnated mixture is subjected, the anode compartment may thus contain no alkali metal, a wicking material lining the surface of the separator directed into the anode compartment being used to wick anode material over said surface as it is produced during said first charge cycle. To prevent any potentially harmful pressure build-up in the anode compartment during the first charge cycle, the anode compartment may be evacuated prior to the start of the first charge cycle to which the impregnated mixture is subjected.

In a particular embodiment of the invention, the separator may be in the form of an elongated tube, the interior of the tube forming the anode compartment. To facilitate wicking, this tube may be aligned with its longitudinal axis substantially horizontal during each charge cycle to which the impregnated mixture is subjected.

Suitable separators are readily available in the form of beta-alumina tubes which are solid conductors of sodium ions and can be used when the alkali metal of the alkali metal chloride and alkali metal aluminium halide liquid electrolyte is sodium. When the interior of the elongated separator tube forms the anode compartment, the tube may be located in a cell housing which defines a cathode compartment outside the tube, in the interior of the housing. In this construction, if the tube is evacuated prior to the first charge cycle, as mentioned above, the tube will then typically be sealed under vacuum, before the first charge cycle is started.

In the case of a beta-alumina tube, and when wicking materal is used as described above, the wicking material may be spread over the surface of the separator facing into the anode compartment, such as the inside of the tube wall. This wicking material may be iron or nickel mesh, and may optionally be tinned. This mesh conveniently acts as part of an anode current collector and may be attached to an evacuation pipe of the same metal, used to evacuate the tube interior prior to the first charge cycle, and projecting out of the cell to form the remainder of the anode current collector and/or to form one of the cell terminals.

The invention extends to a cathode for a high temperature rechargeable electrochemical cell, whenever made according to the method described above. The invention extends further to an electrochemical cell having such cathode.

The invention also extends particularly to a cathode precursor for a high temperature rechargeable electrochemical cell which precursor comprises a mixture in particulate form of an alkali metal chloride and a substance comprising a transition metal selected from the group consisting of iron, nickel, cobalt, chromium, manganese and mixtures thereof, the mixture being impregnated with a chloride ion-containing alkali metal aluminium halide molten salt electrolyte.

The mixture may be contained in a container, the container forming a cathode compartment for use in an electrochemical cell, and the container having a wall at least partially comprising solid electrolyte material. The solid electrolyte may have, on its surface remote from the impregnated mixture, a layer of wicking material thereon for wicking molten anode material over said surface.

The invention extends further particularly to an electrochemical cell precursor which comprises a cathode precursor as described above, and means defining an anode compartment into which is directed the surface of the solid electrolyte remote from the impregnated mixture.

The invention extends yet further to a method of making a cathode precursor for a high temperature rechargeable electrochemical cell, which method comprises forming a mixture in particulate form of an alkali metal chloride and a substance comprising a transition metal selected from the group consisting in iron, nickel, cobalt, chromium, manganese and mixtures of at least two thereof, and impregnating the mixture with a chloride ion-containing alkali metal aluminium halide molten salt liquid electrolyte.

This method may include loading the mixture into a container having a wall at least partially comprising solid electrolyte and lining the surface of the solid electrolyte remote from the mixture with a wicking material for wicking anode material over said surface.

The invention extends still further to a method of making a high temperature rechargeable electrochemical cell precursor which comprises loading a cathode precursor as described above into a cell casing having means defining an anode compartment into which is directed the surface of the solid electrolyte remote from the impregnated mixture.

The main current collector of the cathode of a cell as described above with an anode compartment inside a beta-alumina tube, will usually be the outer housing itself which may be a metal such as the metals mentioned above as suitable for the cathode powder mixture. In this case the housing may be the same metal as that of the powder mixture, or one with a higher charging potential, so that it remains metallic at all times. To improve the initial activation or charging characteristics of the cell, the cathode current collector may include a metal mesh or gauze embedded in the powder mixture and connected eg by welding to the housing.

For close packing in batteries, the cell may have an elongate rectangular housing along the interior of which the tube extends in a more or less central position. To facilitate wicking in the anode compartment, the cell may, as mentioned above, be used horizontally, but this can lead to voids in the cathode compartment formed upon charging as sodium moves into the anode compartment. For this reason the cell may incorporate an electrolyte reservoir, more or less separate from but in communication with the cathode compartment, from which electrolyte can pass, eg by draining under gravity, into the cathode compartment, to keep it flooded with liquid electrolyte at all times. Naturally, for close packing, cells of similar construction but having a hexagonal cross section can be employed instead.

For reasons of availability and cost, the Applicant believes that the metal component of the cathode mixture will usually be metallic iron, nickel, mixtures of metallic iron and nickel or iron with carbon dispersed therein, the molten salt electrolyte being a sodium aluminium chloride electrolyte. The use of metallic iron/nickel mixtures can be desirable to resist progressive build-up of internal resistance of the cell with cycling, believed by the Applicant to arise from possible poisoning of the beta-alumina seperator surface in the cathode compartment by ferric ions arising from $FeCl_3$ production during overcharging cells having metallic iron cathodes. Presence of nickel in the cathode compartment, which is oxidized to $NiCl_2$ during charging, after all the available iron has been oxidized to $FeCl_2$ but before any $FeCl_2$ oxidized to $FeCl_3$, provides an interval after full charging of the iron to $FeCl_2$ and before any $FeCl_3$ is produced. This interval, and the voltage plateau at which nickel is oxidized to $NiCl_2$, which plateau is intermediate those at which iron is oxidized to $FeCl_2$ and $FeCl_2$ is oxidized to $FeCl_3$, provide for easy detection of the stage when all the available iron has been oxidized to $FeCl_2$, at which stage charging can be discontinued without any $FeCl_3$ production. This arrangement thus contemplates metallic iron as the essential electrochemically active cathode metal, with the nickel having a protective role to facilitate avoidance of overcharging with attendant $FeCl_3$ production and separator poisoning.

Similarly, the Applicant has found that doping the molten salt electrolyte with a minor proportion of sodium fluoride also combats progressive internal resistance rise on cell cycling and the invention accordingly contemplates incorporating a small proportion of sodium fluoride in the powder mix from which the cathode is formed. This sodium fluoride dissolves in the liquid electrolyte and is believed possibly to act by suppressing the solubility of $FeCl_2$ in the molten salt electrolyte, thereby reducing the possibility that ferrous ions in the electrolyte can poison the beta-alumina.

The relative proportions of iron and nickel in the powder mix will be selected so that there is a convenient interval between full charging of available iron to $FeCl_2$ on charging and $FeCl_3$ production on overcharging, this advantage being traded off against the electrochemically dead weight of the nickel. The proportion of sodium chloride used in the powder mix is preferably sufficient so that there is some sodium chloride present in the cathode compartment when the cell is fully charged and after all the electrochemically available iron has been oxidized to $FeCl_2$. This prevents the molten salt electrolyte, for the reasons set out hereunder, from becoming acidic.

As regards the amount of sodium chloride to be used, it should be appreciated that not all the iron in the cathode is available for oxidation to $FeCl_2$. A proportion of the iron is inaccessible and will remain as iron, even when the cell is fully charged or overcharged. This proportion can be determined by routine experimentation and the amount of NaCl used in the powder mixture selected accordingly. Typically, enough sodium chloride is used to give a capacity of 0,5 Ah/g iron.

Turning to the molten salt electrolyte, this should be selected so that, at all states of charge, the solubility therein of $FeCl_2$ is at a minimum. This is achieved when the electrolyte comprises a mixture of sodium halide and aluminium halide in a 1:1 mole ratio, with the molten salt being in the presence of at least some solid sodium chloride at all stages of charge, ie a neutral electrolyte. When a beta-alumina separator is used, the only alkali metal present should be the sodium as other alkali metals can adversely affect the separator. Although pure sodium aluminium chloride can be used, a minor proportion of up to 10% on a molar basis or more of the electrolyte may be made up of sodium fluoride, as mentioned above, preferably 5%. It is believed that the sodium fluoride will replace the equivalent proportion of sodium chloride, so that said 1:1 mole ratio is retained. The proportion of sodium fluoride will however be sufficiently low for the electrolyte to retain its essential character as a sodium aluminium chloride electrolyte. In the charging reaction, as sodium chloride in the liquid electrolyte is consumed, solid sodium chloride in the cathode compartment will go into solution in the liquid electrolyte. There must thus be enough sodium chloride, as mentioned above, for some solid sodium chloride to remain in the cathode compartment when the cell is fully charged.

The invention will now be described, by way of example, with reference to the accompanying diagrammatic drawings, in which:

FIG. 1 shows a schematic sectional side elevation of a cell in accordance with the present invention, in the direction of line I—I in FIG. 2; and FIG. 2 shows a sectional end elevation of the cell of FIG. 1, in the direction of line II—II in FIG. 1.

In the drawings, reference numeral 10 generally designates a cell in accordance with the invention. The cell 10 comprises an elongate rectangular mild steel housing 12, having a roof 14, side walls 16 and a floor 18. Under the roof 14, the housing 12 is provided with a liquid electrolyte reservoir 20 defined by an internal partition 22 in the housing 12. The partition 22 extends the length of the housing 10, from one side wall 16 to the other, and is parallel to the roof 14 and floor 18.

At one end of the housing 12 there is provided a filler nozzle 24 for liquid electrolyte, having a screw threaded bore and provided with a threaded closure plug 26. The housing 12 is provided with a pair of end walls 28 between which the partition 22 extends, communication between the reservoir 20 and the remainder of the housing 12 being provided at 30, the nozzle 24 straddling the partition 22. The partition 22, nozzle 24 and plug 26 are similarly of mild steel.

The cathode compartment of the cell is designated 32, and is separated from the reservoir 20 in the housing 12 by the partition 22. The compartment 32 is roughly square in cross-section, as shown in FIG. 2, and a tubular beta-alumina separator 34 is located substantially centrally in the cathode compartment 32. The cell 34 shown in the drawing is approximately to scale.

Panels 38 of nickel gauze, extending the length of the cell 10, project at 40 oppositely inwardly from opposite sides of the housing 12 towards the tube 34, the outer edges of said panels 38 being welded along the inner surfaces of the side walls 16 of the housing 12 at 42, or to the member 28 the panels 38 and housing 12 forming a composite cathode current collector.

Inside the anode compartment there is shown an anode current collector designated 44 in the form of a tinned iron wire mesh which is in close proximity and contact with the tube 34, forming a lining for the interior of the tube 34. The tube 34, as is typical for such tubes, has a closed end, shown in the drawing at the end of the housing 12 having the plug 26, the opposite end of the tube 34 being open and projecting out of the end wall 28 of the housing 12 remote from the plug 26, to which end wall 28 it is sealed as at 46. An evacuation tube 48 projects into the open end of the tube 34, the inner end of the tube 48 being connected to the mesh 44, which mesh acts, in addition to being a current collector, also as wicking material in use for molten sodium in the anode compartment 50 defined by the interior of the tube 34.

A compression type sealing arrangement 52 is provided where the tube 34 projects out of the housing 12, being of conventional construction and having flexible graphite gaskets on the cathode side and greased graphite gaskets on the anode side. The cell has a negative terminal 54 connected to the anode current collector constituted by the mesh 44 and tube 48, and a positive terminal 56 connected to the housing 12, said terminals 54 and 56 being electrically insulated from each other.

To make the cell, the housing 12 and partition 22 are first fabricated; and the mesh/current collector or wick 44 is inserted into the tube 34. The wick 44 is brought into close contact with the inner surface of the tube 34 by isostatic pressing by means of an inflatable rubber tube located inside the tube 34.

Because the cell is used extending horizontally, there is a low working height for sodium inside the tube, and inexpensive coarse tinned iron or mild steel wire mesh can be used, having a wire diameter of about 0,1 mm and an aperture size of about 0,25 mm. To make the mesh lining 44, three layers of this mesh are successively inserted into the tube 34, each of them in turn being inflated and pressed isostatically into a tight fit inside the beta-alumina tube 34 by means of the inflatable rubber tube. Sufficient pressure is used to reduce the formation of any gaps between the mesh and the beta-alumina tube to a minimum, to achieve efficient sodium transport and wetting of the entire surface of the beta-alumina tube 34 by sodium wicked by the mesh 44, which is particularly important during discharge. In this regard it is to be noted that a wick of the type described above and inserted as described above has been found to be so efficient in use that there is no need to provide sodium in the anode compartment at assembly in order to prime the wick.

The beta-alumina tube 34 and its mesh 44 are inserted into the cathode compartment 32 of the housing 12 through an opening in its end wall 28, the outer edges of the gauze panels 38 having been previously welded at 42 along the insides of the side walls 16 of the housing 12.

When the tube 34 has been connected in position in the compartment 32 by the panels 38, cathode precursor material is then packed into said cathode compartment 32 around the beta-alumina tube 34. This cathode precursor material is a powder mixture comprising, as components, iron powder, nickel powder, sodium chloride powder, and sodium fluoride powder. The sodium chloride and sodium fluoride powders are typically mixed together first. The iron and nickel powders are then gently mixed into the mixture of sodium chloride and sodium fluoride, in a fashion sufficiently gentle to avoid damage to the metal powder structure.

A typical composition for the powder mixture is:

| | |
|---|---|
| Nickel powder (Type 255 CARBONYL) | 20% by mass |
| Iron powder (Type C CARBONYL) | 38% by mass |
| Sodium chloride | 40% by mass |
| Sodium fluoride | 2% by mass |

Naturally, other suitable metal powders can be used instead.

This mixture is poured into the cathode compartment 32 and tamped into position to occupy the compartment 32 fully and to surround the beta-alumina tube 34, after the panels 38 have been welded to the side walls 16. In this regard the reservoir 20 will remain empty for the time being, and the powder will be packed through the end of the compartment 32 remote from the plug 26, which will be kept open for this purpose.

It is noted that roughly 2 parts by mass of iron are used for every part by mass of nickel, and sufficient sodium is used to provide a capacity of about 0,5 Ah/g iron, with a small proportion of sodium chloride remaining when the cell is fully charged.

After the powder mix has been tamped into the cathode compartment 32, the beta-alumina tube 34 is sealed into the cathode compartment 32 through which is projects outwardly, by means of the sealing arrangement 52. This can be effected by having the sealing arrangement 52 in a pre-assembled state as an end cap, which can simply be slipped over the open end of the beta-alumina tube 34 and welded to the end wall 28 at 46.

Sodium aluminium chloride molten salt electrolyte is then charged in molten form into the housing 12 via the nozzle 24, the housing being held with the nozzle 24 uppermost for this purpose. To ensure that the contents of the housing 12 are dry before filling with liquid electrolyte, the cell is heated to a temperature of 200°-300° C. and evacuated. Immediately after this evacuation, and while the housing is at a temperature above 200° C., the electrolyte is charged into the housing at a similar temperature and vacuum-impregnated into the powder mix. Electrolyte is charged so as to fill the reservoir 20 and cathode compartment 32, and to saturate the powder in the cathode compartment. While the cell is still above 200° C., the plug 26 is inserted into the nozzle 24 using a graphite paper gasket for sealing or polytetrafluoroethylene (PTFE)-tape and a tapered thread.

The cell and its cathode will now be in their precursor stage, ready for activation by the first charging cycle.

The cell is activated by charging via the terminals 54, 56 at its operating temperature which will typically be between 200° and 300° C., eg 250° C. Immediately prior to or during this activation, the interior of the beta-alumina tube 34 is evacuated, at least partially, through the tube 48. The reason for this is that, during charging, sodium moves into the anode compartment 50 through the beta-alumina tube 34, and this evacuation reduces such pressure build-up as can take place in the anode compartment 50 during charging. If desired, the evacuation can take place prior to the activation, after which the tube 48 is sealed, or the activation charging cycle can take place while the tube 34 is being evacuated through the tube 48, the tube 48 being sealed after the initial charging or activation cycle.

During charging the nickel gauze remains metallic, as the charging potential of the iron component of the cathode mixture is below that of nickel. Charging is essentially in accordance with the following reaction at the cathode:

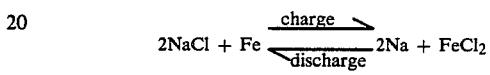

$$2NaCl + Fe \underset{\text{discharge}}{\overset{\text{charge}}{\rightleftarrows}} 2Na + FeCl_2$$

Accordingly, during charging, the available iron of the cathode is converted to $FeCl_2$, and during discharging, the $FeCl_2$ is converted to iron.

It is believed that, in use and during discharging, iron formation starts to take place in the vicinity of the nickel gauze panels 38. It is then believed to grow in the form of an iron network which acts as a secondary current collecting matrix, extending away from said gauze into the bulk volume of the cathode material in the cathode compartment. Post mortem studies on discharged cathode of cells in accordance with the invention have shown that iron particles are found to be bonded together, giving an effect similar to sintered iron particles. In this regard the Applicant has found that it is possible to replace the nickel gauze by nickel plated iron gauze or by iron gauze. Furthermore, this gauze may instead be distributed in other suitable arrangements in the cathode compartment, and connected to the housing 12, and indeed it is contemplated that the gauze can be omitted entirely, the cell housing acting as the cathode current collector.

Cells as described above and having a beta-alumina tube area of 500 $cm^2$ have been operated in the horizontal position at 250° C., with a cell resistance of approximately 6 milliohms at the start of discharge. A capacity of 170 Ah was obtained and at the 5 hour discharge rate the specific energy of the cell was 100 Wh/kg, the cell being rechargeable in 8 hours.

In use the presence of the nickel powder in the cathode compartment, and indeed the nickel current collector, assist in providing an interval between full charge of the available iron to $FeCl_2$, and the stage when any $FeCl_3$ is produced, at the start of which interval full charge can easily be detected by an increase in the charging potential of the cell. This permits charging to be discontinued reliably before any overcharge takes place, and prevents the production of any $FeCl_3$ in the cell, which is believed by the applicant to contribute significantly to irreversible increases in internal resistance in the cell, by poisoning the beta-alumina surface which faces into the cathode compartment. Similarly, the presence of the sodium fluoride in the cathode compartment, which dissolves into the liquid electrolyte and dopes it, has been found to retard such progressive build-up in internal resistance. It is to be noted that the sodium aluminium chloride electrolyte, which is always in the presence of at least some sodium chloride in the cathode compartment, is selected to have a 1:1 mole ratio between sodium chloride and aluminium chloride, thereby being neutral in a Lewis acid sense. At this ratio the solubility of $FeCl_2$ therein is at its minimum. The presence of a small excess of sodium chloride ensures that this 1:1 mole ratio is maintained at all states of charge, and the sodium fluoride is believed to reduce the minimum solubility at said 1:1 mole ratio even further.

During the charging cycle, sodium leaves the cathode compartment and enters the anode compartment. This leaves voids in the cathode compartment, and the purpose of the reservoir 20, filled with electrolyte, is to keep the cathode compartment 32 continually flooded with electrolyte at all states of charge. In this regard the partition 22 acts to isolate the electrolyte reservoir from the cathode compartment 32, and to keep the various components of the cathode in position around the beta-alumina tube 34, communication between the reservoir 20 and cathode compartment 32 taking place at 30.

The cell in accordance with the present invention, and the method of making it, have a number of advantages. The cell is designed for horizontal use, and is therefore attractive for electric vehicle use, because of its low vertical height which enables it to be assembled conveniently into a shallow battery located in a shallow battery box or housing, which can be placed in an out of the way position on a vehicle chassis. Furthermore, the low height of the anode compartment allows a simple, inexpensive and yet efficient wicking system to be used for rapid and complete sodium transport to the inner surface of the beta-alumina tube, to wet said inner surface. Coarse mesh can be used for this purpose.

Horizontal use, with the electrolyte reservoir 20 above the cathode compartment 32, allows the cathode compartment 32 to remain flooded at all times with electrolyte, even when sodium has moved during charging from the cathode compartment into the interior of the tube 34 to create potential voids in the cathode compartment. In cells where a beta-alumina tube separator is used in a vertical condition, with an interior cathode compartment, part of the beta-alumina tube has had to be used as a reservoir for this purpose, the part of the beta-alumina tube used as a reservoir being electrochemically inactive. Having the cathode outside the beta-alumina tube, coupled with the electrolyte reservoir and horizontal use, allows 100% utilization of the area of the beta-alumina tube.

Having the housing 12 rectangular in cross-section allows close packing of cells in a battery, and having the cathode compartment roughly square in outline allows the beta-alumina tube 34 to be placed more or less centrally in the cathode compartment, at a more or less even spacing from the walls of the cathode compartment. Furthermore, easy packing of cells in a rectangular battery box is possible, leading to a relatively good volumetric energy density.

The Applicant however believes that possibly the major advantage of the cell is its simplicity, ease and safety of construction. In particular the handling of elemental sodium, with the attendant dangers, is avoid entirely. Apart from the filling with molten salt electrolyte, substantially all the assembly of the cell can take place at ambient temperatures and pressures, with relatively harmless materials. It is only during the final step of filling with molten salt electrolyte, immediately before activation, that elevated temperatures are encountered. This translates readily into rapid, inexpensive and safe manufacture on a bulk scale. The cell can be assembled in the open atmosphere, with safety precautions being important only during electrolyte filling.

The Applicant believes that the results obtained by the Applicant's preliminary work described herein can in principle be improved. Thus it may be possible to reduce the proportion of nickel powder used to reduce the dangers of overcharging; more effective packing of the initial cathode powder mix into the housing, together with selection of improved powder mixes can in principle increase the capacity of the cathode per unit volume; and possible increases in beta-alumina tube diameter together with effective hermetic sealing and complete evacuation of the anode compartment during charging can also in principle contribute to increased volumetric energy density.

Finally, it should be noted that, although in the foregoing description emphasis has been given to cells in which there is a horizontal Beta-Alumina tube whose interior is the anode compartment and outside which the cathode compartment is provided, the situation could naturally be reversed and the cathode compartment could be inside the tube, without departing from the invention. Furthermore, the cell can be used in other attitudes, EG in which the tube is vertical.

I claim:

1. A method of making a cathode for a high temperature electrochemical cell, which method comprises forming a mixture in particulate form from an alkali metal chloride and a substance comprising a transition metal selected from the group consisting of iron, nickel, cobalt, chromium, manganese and mixtures of at least two thereof, impregnating the mixture with a chloride ion-containing alkali metal aluminum halide molten salt liquid electrolyte, and subjecting the impregnated mixture to at least one charge cycle in a high temperature electrochemical cell in which the electrolyte is molten and the alkali metal chloride and the substance comprising a transition metal chloride are solid, and in which the impregnated mixture forms the cathode, said impregnated mixture being located in a cathode compartment in the cell and separated from an anode compartment in the cell by a solid electrolyte separator, alkali metal being formed in the anode compartment during said charge cycle, the relative proportions of the alkali metal chloride, the substance comprising a transition metal and the liquid electrolyte being selected so that when all the substance comprising a transition metal available for chlorination has been chlorinated, there is a residue of unchlorinated substance comprising a transition metal in solid form dispersed in the cathode, the liquid electrolyte at all times remaining a neutral equimolar mixture of aluminum chloride and alkali metal chloride, and so that the cathode, upon subsequent discharge thereof, forms an electronically conductive electrolyte-permeable porous matrix in which the alkali metal chloride in solid form is dispersed and in which the liquid electrolyte is impregnated.

2. A method as claimed in claim 1, in which the alkali metal of the alkali metal chloride is sodium and the alkali metal of the alkali metal aluminium halide is also sodium, the separator being a solid conductor of sodium ions.

3. A method as claimed in claim 1, in which the mixture is formed by mixing together the alkali metal chloride in powder form with a powder comprising at least one member of the group consisting of said transition metals in metallic form and the intermediate refractory hard metal compounds of said transition metals, said intermediate refractory hard metal compounds comprising at least one non-metal selected from the group consisting in carbon, boron, nitrogen, silicon and phosphorous.

4. A method as claimed in claim 3, in which sodium chloride in powder form is mixed with a metallic powder selected from the group consisting of iron, nickel and mixtures thereof.

5. A method as claimed in claim 1, in which impregnating the mixture containing the alkali metal halide and transition metal is by saturating the mixture with the molten salt electrolyte in molten liquid form.

6. A method as claimed in claim 5, in which, prior to the saturation, the mixture is loaded into the cathode compartment of the cell in which the charge cycle takes place and is consolidated in said cathode compartment, the mixture being heated to a temperature at which the molten electrolyte is molten before the molten electrolyte is impregnated into the mixture.

7. A method as claimed in claim 1, in which, at the start of the first charge cycle to which the impregnated mixture is subjected, the anode compartment contains no alkali metal, a wicking material lining the surface of the separator directed into the anode compartment being used to wick anode material over said surface as it is produced during said first charge cycle.

8. A method as claimed in claim 1, in which the anode compartment is evacuated prior to the start of the first charge cycle to which the impregnated mixture is subjected.

9. A method as claimed in claim 1, in which the separator is in the form of an elongated tube, the interior of the tube forming the anode compartment.

10. A method as claimed in claim 9, in which the tube is aligned with its longitudinal axis substantially horizontal during each charge cycle to which the impregnated mixture is subjected.

11. A cathode for a high temperature rechargeable electrochemical cell whenever made according to the method of claim 1.

12. An electrochemical cell having a cathode as claimed in claim 11.

13. A cathode precursor for a high temperature rechargeable electrochemical cell, which precursor comprises a mixture in particulate form of an alkali metal chloride and a substance comprising a transition metal selected from the group consisting of iron, nickel, cobalt, chromium, manganese and mixtures thereof, the mixture being impregnated with a chloride ion-containing alkali metal aluminum halide molten salt electrolyte, the relative proportions of the alkali metal chloride, the substance comprising a transition metal and the liquid electrolyte being selected so that when all the substance comprising a transition metal available for chlorination is electrochemically chlorinated to convert the precursor into a cathode, there is a residue of unchlorinated substance comprising a transition metal in solid form dispersed in the cathode, the liquid electrolyte at all time remaining a neutral equimolar mixture of aluminum chloride and alkali metal chloride, and so that the cathode, upon subsequent discharge thereof, forms an electronically conductive electrolyte-permeable porous matrix in which the alkali metal chloride in solid form is dispersed, and in which the liquid electrolyte is impregnated.

14. A cathode precursor as claimed in claim 13, in which the mixture is contained in a container, the container forming a cathode compartment for use in an electrochemical cell, and the container having a wall at least partially comprising solid electrolyte material.

15. A cathode precursor as claimed in claim 14, in which the solid electrolyte has, on its surface remote from the impregnated mixture, a layer of wicking material thereon for wicking molten anode material over said surface.

16. An electrochemical cell precursor which comprises a cathode precursor as claimed in claim 14, and means defining an anode compartment into which is directed the surface of the solid electrolyte remote from the impregnated mixture.

17. A method of making a cathode precursor for a high temperature rechargeable electrochemical cell, which method comprises forming a mixture in particulate form of an alkali metal chloride and a substance comprising a transition metal selected from the group consisting in iron, nickel, cobalt, chromium, manganese and mixtures of at least two thereof, and impregnating the mixture with a chloride ion-containing alkali metal aluminum halide molten salt liquid electrolyte, the relative proportions of the alkali metal chloride, the substance comprising a transition metal and the liquid electrolyte being selected so that when all the substance comprising a transition metal available for chlorination is electrochemically chlorinated to convert the precursor into a cathode, there is a residue of unchlorinated substance comprising a transition metal in solid form dispersed in the cathode, the liquid electrolyte at all times remaining a neutral equimolar mixture of aluminum chloride and alkali metal chloride, and so that the cathode, upon subsequent discharge thereof, forms an electronically conductive electrolyte-permeable porous matrix in which the alkali metal chloride in solid form is dispersed, and in which the liquid electrolyte is impregnated.

18. A method as claimed in claim 17, which includes loading the mixture into a container having a wall at least partially comprising solid electrolyte and lining the surface of the solid electrolyte remote from the mixture with a wicking material for wicking anode material over said surface.

19. A method of making a high temperature rechargeable electrochemical cell precursor which comprises loading a cathode precursor as claimed in claim 18 into a cell casing having means defining an anode compartment into which is directed the surface of the solid electrolyte remote from the impregnated mixture.

* * * * *

UNITED STATES PATENT AND TRADEMARK OFFICE
CERTIFICATE OF CORRECTION

PATENT NO. : 4,722,875
DATED : February 2, 1988
INVENTOR(S) : Michael Lawrence Wright It is certified that error appears in the above—identified patent and that said Letters Patent is hereby corrected as shown below:

In claim 1, at column 10, line 41, "transition metal chloride" should read --transition metal--

Signed and Sealed this

Fifth Day of November, 1991

Attest:

HARRY F. MANBECK, JR.

Attesting Officer

Commissioner of Patents and Trademarks